United States Patent

Reese et al.

[15] 3,695,287

[45] Oct. 3, 1972

[54] THIEF PROOF FUEL SYSTEM

[72] Inventors: Richard T. Reese, 31701 W. Kentfield Court, Westlake Village, Calif. 91360; Nile Ray Weatherman, 12830 Montague St., Pacoima, Calif. 91331

[22] Filed: Nov. 27, 1970

[21] Appl. No.: 93,178

[52] U.S. Cl. ............... 137/354, 70/370, 137/384.2, 137/385
[51] Int. Cl. .................... B60r 25/04, F16k 35/06
[58] Field of Search .......... 70/57, 176, 179, 242, 243, 70/244, 370, 451; 137/354, 383, 384.2, 384.4, 384.6, 384.8, 385; 200/44; 248/27, 300

[56] References Cited

UNITED STATES PATENTS

| 1,217,406 | 2/1917 | Burkhardt | 137/384.2 |
| 1,179,628 | 4/1916 | Hines | 137/384.2 |
| 3,343,386 | 9/1967 | Hall | 70/370 X |
| 1,448,836 | 3/1923 | Fisher | 137/384.2 X |
| 3,543,096 | 11/1970 | Bedford | 200/44 X |

*Primary Examiner*—Albert G. Craig, Jr.
*Attorney*—Angus & Mon

[57] ABSTRACT

A thief proof fuel system involving the flow of gasoline from a fuel tank to an engine wherein a valve is included in the fuel line, which valve can be closed and kept locked in its closed condition. Preferably, the valve is on the opposite side of a bulkhead from the key slot, and in the preferred embodiment is under the floorboard where in modern cars there is too little clearance for a thief to tamper with the device in a practical length of time.

2 Claims, 6 Drawing Figures

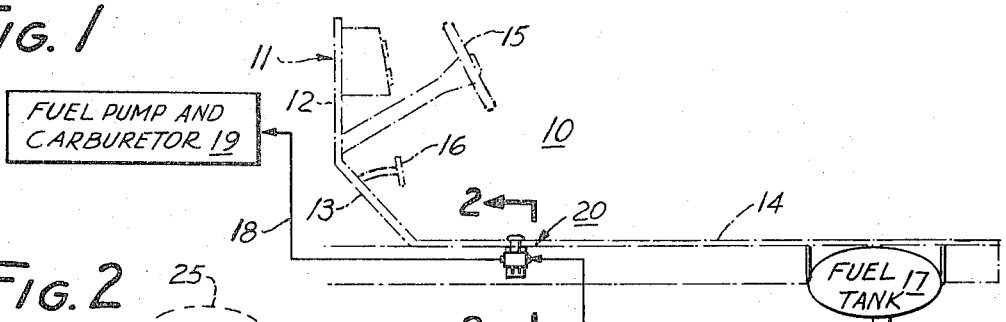
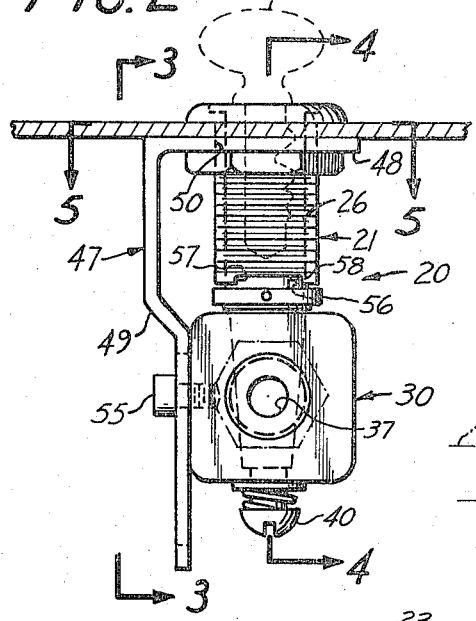
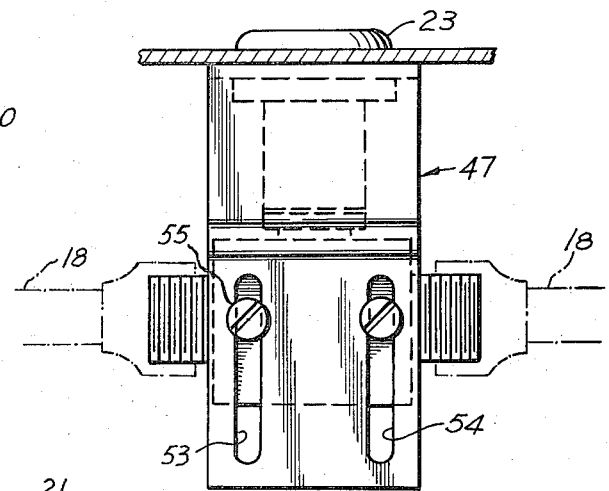
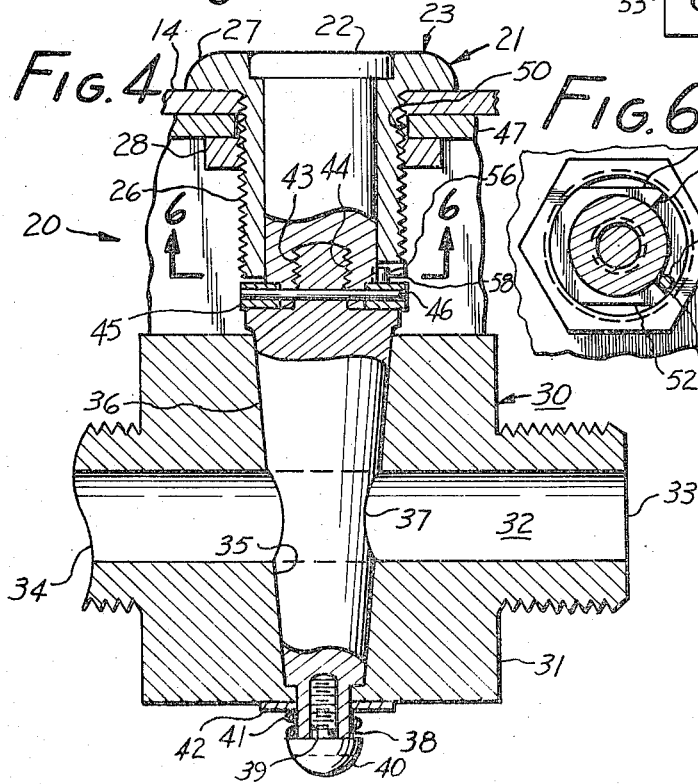
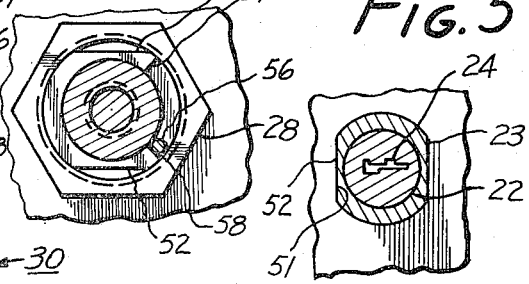
INVENTORS:
RICHARD T. REESE
NILE RAY WEATHERMAN
BY
ATTORNEYS.

THIEF PROOF FUEL SYSTEM

This invention relates to a thief proof fuel system, including a valve which can be locked in a closed position so as to shut off flow of fuel to an internal combustion engine.

With the rapidly rising rate of car thefts, attention has increasingly turned to devices and techniques to foil the attempts of thieves to steal the car. Audible alarms, secondary ignition switches, and the like, have been suggested in great variety, but in general, they can readily be frustrated by the thieves, and there remains a need for an inexpensive, reliable system to frustrate their efforts.

It is an object of this invention to provide a valve included in the fuel line which can be turned to a closed position and locked there so as to prevent fuel flow to the engine. In the preferred embodiment the valve is on the opposite side of a bulkhead from the passenger compartment so as to render access to the valve more difficult, while leaving the key slot conveniently accessible. Preferably, this location is below the floorboard of the vehicle where there is too little clearance for the thief expeditiously to go under the car and tamper with the valve.

It is another object of this invention to provide a readily installed and economically feasible device for the purpose intended.

A thief proof fuel system according to the invention comprises, in combination with a fuel line, a valve having an open and a closed position determined by the position of a valve operator. The operator is in turn connected to the rotary portion of a lock, the lock being controllable by a key.

According to a preferred but optional feature of the invention, the lock includes retention flats engageable with a matching flat on a bulkhead in which the lock is to be fitted, thereby facilitating the mounting of the device.

According to still another preferred but optional feature of the invention, the valve comprises a simple, tapered plug type which can readily be maintained and which, upon disassembly, leaves the valve in such a leaky condition as would continue the frustration of the operation of the vehicle.

The above and other features of this invention will be fully understood from the following detailed description and the accompanying drawings, in which:

FIG. 1 is a side elevation in schematic notation showing a vehicle utilizing the presently preferred embodiment of the invention;

FIG. 2 is a section taken at line 2—2 of FIG. 1;

FIGS. 3, 4 and 5 are sections taken at 3—3, 4—4 and 5—5 of FIG. 2; and

FIG. 6 is a cross-section taken at line 6—6 of FIG. 4.

In FIG. 1 there is shown the passenger compartment 10 of a vehicle, including a bulkhead 11 having a dash section 12, a controls section 13, and a floorboard section 14. The conventional controls, such as the steering wheel 15 and pedals 16, are shown for reference purposes.

A fuel tank 17 contains fuel for the operation of an engine (not shown), and a fuel line 18 passes to a fuel pump and carburetor 19 of the engine, the fuel pump and carburetor being regarded as parts of the engine.

A thief proof device 20 is inserted in fuel line 18 and is preferably mounted to some bulkhead so that part of it is outside the passenger compartment. In the preferred embodiment illustrated, it is mounted to the floorboard section. As can be seen, the installation involves no more than the cutting of the fuel line and the insertion of the valve in it.

The device includes a lock 21 having a lock rotary portion 22 and a lock body portion 23. The rotary portion includes a key slot 24 to receive a key 25 which when inserted will enable the rotary portion to be turned relative to the body portion in accordance with the usual lock concepts.

The outside of the body portion includes an external thread 26. The body portion also has an overhanging head 27 for purposes yet to be discussed. A nut 28 is threaded to thread 26.

The device also includes a valve 30, the valve including a body 31 having a flow passage 32 extending therethrough from an inlet 33 to an outlet 34. The inlet and outlet include externally threaded nipples for attachment of the line, and line 18 is attached to both the inlet and the outlet by conventional means such as "B" nuts. A plug passage 35 intersects the flow passage and is preferably tapered in accordance with common taper valve construction. A tapered plug 36 fits in the plug passage and includes a flow port 37, extending therethrough in alignment with flow passage 32. Plug 36 includes a neck 38 with a threaded sink 39 in its end to receive a screw 40 which bears against a bias spring 41 and which spring bears against a washer 42 to hold the plug installed in the valve body.

The other, larger, end of the plug also includes a neck 43 which is threaded into a sink 44 in the end of the rotary portion of the lock. A washer 45 is disposed between the rotary portion and the plug and is ported, as is the neck, to receive a pin 46 which rigidly fixes and locks the plug to the lock rotary portion and prevents its rotation relative thereto and its removal therefrom. The ends of this pin may be peened over or otherwise fixed, thereby making more difficult and time-consuming the removal of the plug from the lock.

The device 20 is mounted to the floorboard section by means of a mounting adapter 47 with a first flange 48 and a second flange 49. The first flange includes a hole 50 with a pair of flats 51 which will prevent the rotation of the mounting adapter relative to the floorboard. The floorboard has similar flats, and the outside of the body portion of the lock has matching flats 52 which prevent rotation of the body relative to the floorboard. It will now be seen that these flats provide a retention means preventing rotation of the device. Nut 28 is brought up tightly against the mounting adapter so as to hold it firmly in place.

The second flange has a pair of slots 53, 54 adapted to receive screws 55 with overhanging heads for the purpose of mounting the valve body thereto. The length of these slots enables the valve body readily to be mounted in a wide range of applications and clearances. A limit pin 56 is formed on washer 45 and is engageable with a pair of shoulders 57, 58 on the lock body that limit the extent to which the valve can be turned.

It will now be seen that the valve body and the lock are firmly attached to the floorboard or other bulkhead construction in a non-rotatable manner. The installation may be readily accomplished simply by cutting a hole of the correct size and shape in the bulkhead using any desired cutting tool, such as a broach, for the purpose, and then passing the lock body portion 23 through the hole placing the mounting adapter in place, applying and tightening the nut and then, the valve body having already been assembled to the valve plug, attaching screws 55. Slots 53 and 54 enable the valve body to be moved relative to the lock while still leaving the plug mounted to the lock, and the lock to the floorboard or bulkhead. It will also be noted that the valve body can be removed from the mounting member, even when connected to adjacent parts of the fuel line. The fuel line is connected to the inlet and the outlet, screws 55 are tightened to hold the valve body in place, and the device is completely installed.

With the device installed in the position shown in FIG. 1, it is only necessary to reach down and turn the lock a quarter-turn in order to disable the vehicle. With so little clearance between the ground and the frame of a standard vehicle, a thief is very unlikely to take the time to crawl under the car, attempt to tamper with the device, or to bypass the line, because the amount of time available for stealing a car is generally regarded as quite short.

The device may be mounted in other places such as under the controls section of the dash section or simply somewhere in the engine compartment. It may also be placed in various locations in the fuel line, even downstream of the fuel pump. In every case, the device functions to frustrate the operation of the car because, even if it starts with the small amount of gasoline available with the line shut down, the car will not go more than a short distance without the engine's ceasing to function. The device can be made from inexpensive and commercially available components, can quickly be installed, and completely frustrates the conventional efforts of thieves in stealing cars.

This invention is not to be limited by the embodiment shown in the drawings and described in the description which is given by way of example and not of limitation, but only in accordance with the scope of the appended claims.

We claim:

1. A thief proof fuel system for an automotive vehicle which includes a fuel line extending from a gas tank to an engine, and said vehicle having a barrier such as a floorboard or bulkhead, with an opening having a flat bounding a side thereof, said system comprising: a lock mounted to the barrier, said lock comprising a body portion having an external flat to engage the flat on the barrier, thereby to hold the lock body portion against rotation, said body portion also having a head to bear against the barrier, said lock further including a rotary portion which is rotatable in the body portion when turned by a key; a mounting member having a first and a second flange, said first flange having an opening with a flat bounding a side thereof, the body portion passing through said last-named opening with their respective flats engaged, whereby the mounting member is also held against rotation relative to the barrier; and a valve comprising a valve body with a flow passage therethrough, and a plug passage transverse to and intersecting the flow passage, said valve body being removably attached to the second flange of the mounting member, and removable therefrom even when connected to adjacent portions of the fuel line, a valving element rotatably mounted in the plug passage and having a transverse flow passage which is alignable or non-alignable with the flow passage of the valve body as a function of the rotational setting of the valving element, said valving element being pinned to the lock rotary portion and removably attached to the valve body; and a washer pinned to both the lock rotary portion and to the valving element so as to rotate with them; a limit pin mounted to the washer, and a pair of limit stops on the valve body to limit the rotational movement of the valving element in both directions of rotation by contact with the limit pin.

2. A system according to claim 1 in which a pair of slots are formed in said second flange which extend parallel to the valving element, and in which a pair of headed fasteners pass through said slots into the valve body so as to mount the same to the flange, the position of the valve body being adjustable by loosening the fasteners and sliding them along the slots.

* * * * *